US005778155A

United States Patent [19]

Hepner

[11] Patent Number: 5,778,155

[45] Date of Patent: Jul. 7, 1998

[54] METHOD AND APPARATUS FOR SELECTING AMONG COMPETING FACTS TO ACHIEVE THE DESIRED CALCULATION

[75] Inventor: Daniel W. Hepner, Sunnyvale, Calif.

[73] Assignee: Hewlett-Packard Company, Palo Alto, Calif.

[21] Appl. No.: 541,843

[22] Filed: Oct. 10, 1995

[51] Int. Cl.⁶ .................................................. G06F 17/00
[52] U.S. Cl. ................................ 395/51; 706/46; 706/47; 706/45; 706/50
[58] Field of Search ............................... 395/50, 51, 64, 395/60, 61, 52

[56] References Cited

U.S. PATENT DOCUMENTS 5,418,888  5/1995  Alden ........................................... 395/64
5,517,405  5/1996  McAndrew et al. ........................ 395/50

OTHER PUBLICATIONS

Ortiz, Charles L. et al. "Intelligent Information Management in a Distributed Environment" Proceedings of the Fifth Annual AI Systems in Government Conference. pp. 54–60, May 1990.

*Primary Examiner*—Allen R. MacDonald
*Assistant Examiner*—Jason W. Rhodes

[57] ABSTRACT

A rules-based method and apparatus for discriminating amongst a plurality of facts to arrive at a best result applies at least three primary decision-making rules, ie. (1) it is usually undesirable to use an input in combination with a fact which was based on that particular input; (2) using a fact based on several inputs is usually better than using a fact based on a single input; and (3) using a fact based on a shorter series of relationships is usually better than using a fact based on a longer series of relationships.

10 Claims, 2 Drawing Sheets

METHOD AND APPARATUS FOR SELECTING AMONG COMPETING FACTS TO ACHIEVE THE DESIRED CALCULATION

BACKGROUND OF THE INVENTION

1. Technical Field

The invention relates to discriminating amongst a plurality of input data. More particularly, the invention relates to a method and apparatus for selecting among competing facts to achieve a desired calculation.

2. Description of the Prior Art

A computer program may be written to gather input information from a user and/or from a collection of stored data regarding physical materials or events, for example relating to the properties of such materials as air or copper, as well as various relations between certain types of information. Using relationships defined in the program, the program can generate additional information. Both the original input information and the information derived therefrom are then available to be combined in accordance with other defined relationships to generate yet more information. In such way, it is possible to generate endless amounts of information by repeatedly recombining previously entered or derived information in accordance with different relationships.

For example, given an object having a radius of one meter, it is possible to determine the circumference of the circle. Once the circumference is determined, there are two facts relating to length, i.e. radius and circumference. It is then possible to determine the area of a rectangle having one side that is the radius of a circle and another side that is the circumference of the circle, although such information would be useless in most cases. Thus, it is possible to combine known information in many ways to calculate many other kinds of information.

Unfortunately, if a particular problem is to be solved, most of this information is either useless or meaningless with regard to that particular problem. It is therefore desirable to generate only such information as is necessary for the problem to be solved. It is also important that only the most appropriate information from competing pieces of information be applied to the problem to be solved. Thus, if information is randomly selected from the first, second, and later generation information that is available, the result achieved by applying such information to solve the problem at hand may often be suspect, based upon a long and tenuous chain of derivation. It is desirable to provide a way of discriminating between various forms of such information, such as original information and second or later generation information derived therefrom, to apply the most relevant information to the problem to be solved, and to then solve the problem in the most direct manner possible, i.e. in keeping with Occam's Razor, using the simplest solution.

It would therefore be desirable to provide a technique for selecting and/or generating useful information from the nearly infinite possible pieces of information that may be generated in a data processing environment, and then apply only the most relevant and appropriate pieces of such information, especially where there are competing pieces of information, each of which may be applied to solve a particular problem.

SUMMARY OF THE INVENTION

The invention provides a method and apparatus for discriminating amongst a plurality of facts to arrive at a best result. Such discrimination is rules-based, applying three primary decision-making rules:

1. It is usually undesirable to use an input in combination with a fact which was based on that particular input.
2. Using a fact based on several inputs is usually better than using a fact based on a single input.
3. Using a fact based on a shorter series of relationships is usually better than using a fact based on a longer series of relationships.

Accordingly, the invention provides a technique for selecting and/or generating useful information from the nearly infinite possible pieces of information that may be generated in a data processing environment, and then applies only the most relevant and appropriate pieces of such information, especially where there are competing pieces of information, each of which may be applied to solve a particular problem.

DETAILED DESCRIPTION OF THE INVENTION

The invention provides a method and apparatus for discriminating amongst a plurality of facts to arrive at a best result. Such discrimination is rules-based, applying three primary decision-making rules:

1. It is usually undesirable to use an input in combination with a fact which was based on that particular input.
2. Using a fact based on several inputs is usually better than using a fact based on a single input.
3. Using a fact based on a shorter series of relationships is usually better than using a fact based on a longer series of relationships.

The first rule is applied in situation that starts off with one fact from which many different types of information may be derived, and where most of this information is of little or no value with regard to a problem to be solved. It the one fact is combined with another fact which is independent of that fact, then the result is more likely to have value with regard to a problem to be solved.

Thus, facts that are not related or facts that are independent of each other are more likely to produce interesting information than related facts. For example, given two lines, it is possible to calculate the area within a rectangle circumscribed by the two lines. Thus, calculating the area of a rectangle by multiplying both of these lines together (two independent facts) is likely to produce a more useful result than multiplying only one of the two lines by itself to calculate the area of a square (two related facts).

The second rule is applied where there are several different facts available for use in determining a value, for example to calculate volume. Given a variety of input information, it may be possible to calculate a given volume in several different ways. In such case, the preferred embodiment of the invention uses the method for performing the calculation that has the highest score. The score is determined by the amount of input information available for each of the methods for performing the calculation. The method that has the most of its input terms satisfied by independent information receives the highest score. For example, it is possible to calculate volume from input values for length, width, and height. It is also possible to calculate volume from the area of a rectangle and an altitude. In such example, the second rule assigns a higher value to the method of calculating volume that uses the greatest number of independent facts. That is, volume is calculated using length× width×height, rather than area×altitude because the former method is base upon three independent facts (length, width, and height), while the latter method is only based upon two independent facts (area and altitude).

The third rule states that facts calculated from longer chains and relationships are inferior to facts calculated from shorter chains and relationships. This rule is based upon the observation that the further down the chain one proceeds, the more likely it is that useless information is generated.

Figure 1:
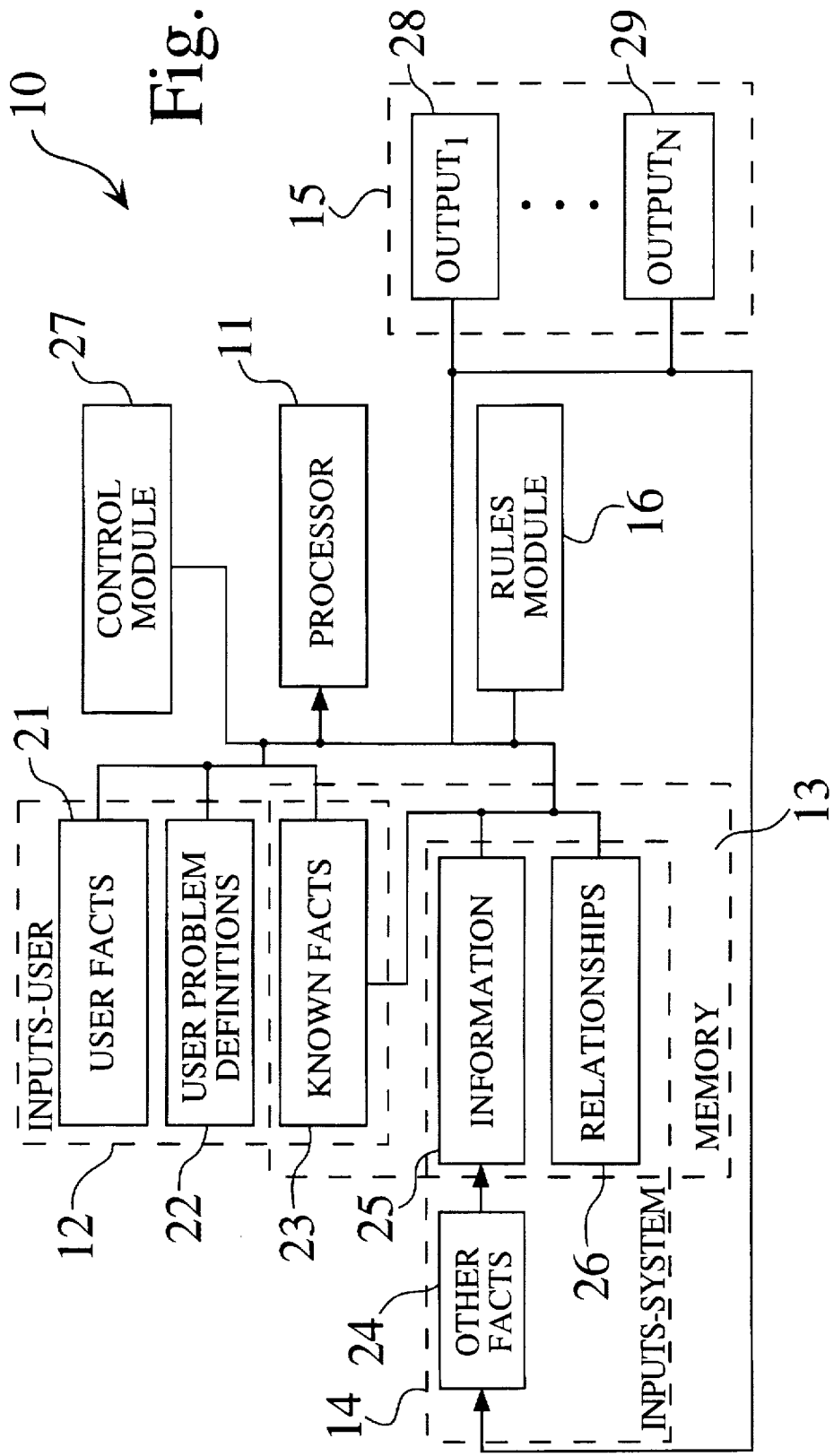
FIG. 1 is a block diagram of a system for selecting among competing facts to achieve a desired calculation according to the invention.

FIG. 1 is a block diagram of a system 10 for selecting among competing facts to achieve a desired calculation according to the invention. In the figure, a processor 11 includes a memory 13, a user input module 12, a system input module 14, an output module 15, and a rules module 16. System operation is supervised by an interactive control module 27.

The user input module 12 includes a module 21, such as a keyboard, touchpad, or mouse, for user input of user facts, such as weight, height, speed, or temperature. The user input module also includes a module 22, which may also be a keyboard or other known input device, that allow a user to input a problem definition, such that the processor is configured to solve a particular problem (see the examples below).

The memory 13 provides storage for modules that provide the processor with known facts 23, information necessary as part of the problem solving process 25, and definitions of relationships among information 26 that are applied during the problem solving process.

The information module 25 and relationships modules 26, each of which are preferably a component of the system memory 13, along with an other facts module 24, comprise the system inputs module 14. The other facts module is used, for example, to provide facts that are generated during earlier steps of the problem solving process.

During a problem solving sequence, all facts are input to the processor 11 by the user input module 12 and the system input module 14. These facts are then applied to solve the problem at hand in accordance with a decision making protocol that is implemented in the rules module 16 (see FIG. 2). Once a problem solving sequence is completed, an output value is passed to the output module 15, which may include one or more output devices 28, 29, such as a display or printer, or which may be input to the system input module 14 for use as part of a next stage in the problem solving process.

Figure 2:
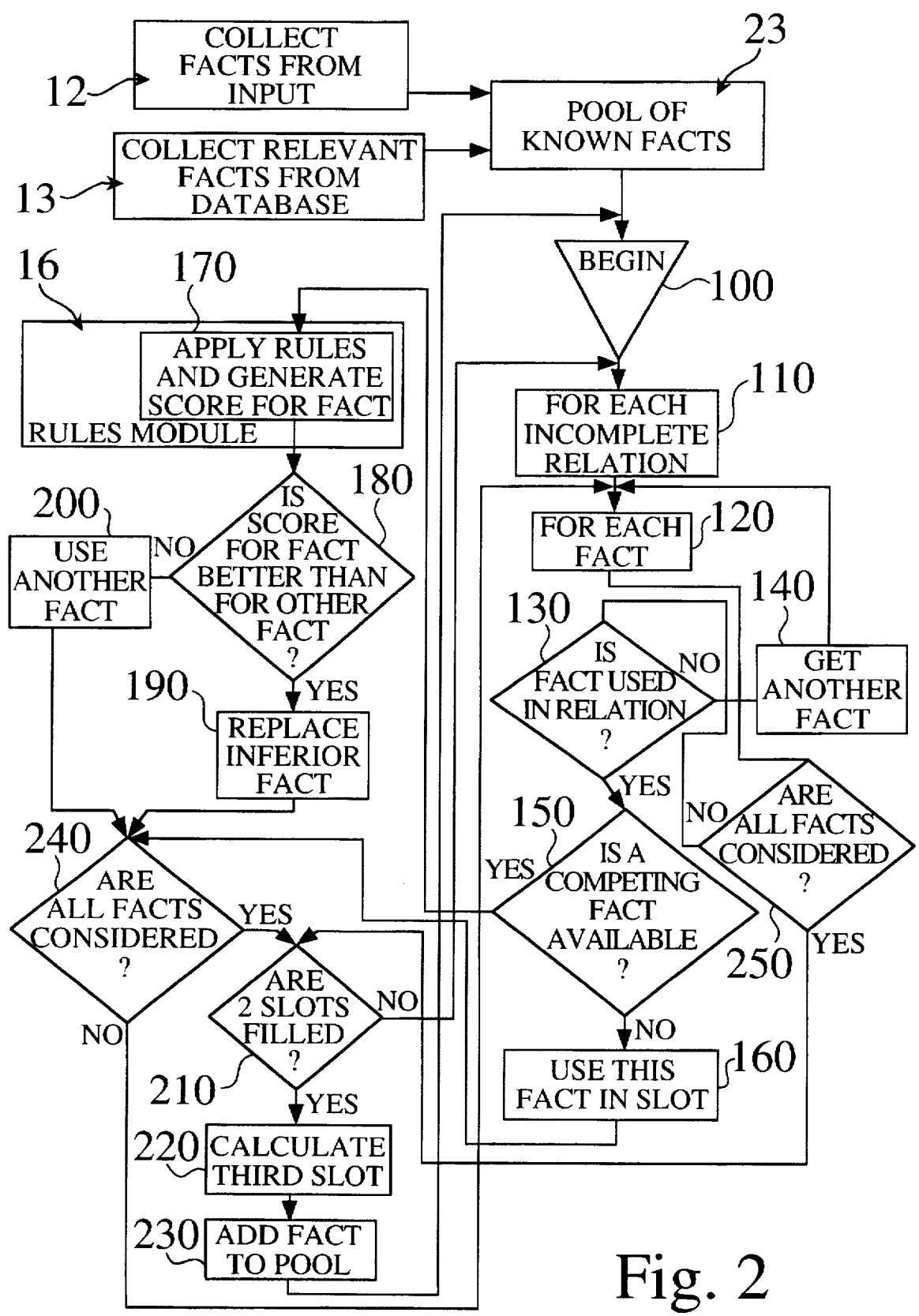
FIG. 2 is a flow diagram showing operation of the system of FIG. 1 according to the invention.

FIG. 2 is a flow diagram showing operation of the system of FIG. 1 according to the invention. The logic flow shown on FIG. 2 is described below in connected with an example of pseudo-code. It will be appreciated by those skilled in the art that such pseudo-code is readily reduced to a functioning computer program by the exercise of ordinary skill.

In operation, the preferred embodiment of the invention searches all available facts to determine if any facts are available to solve the problem at hand. If a fact is found, that fact is saved and the system continues to look for additional facts that may be more appropriate, based upon application of the above rules. If one and only one fact was located, then that fact is used. If two or more facts are available, then the most desirable one of these facts is selected and applied to satisfy any desired physical and/or mathematical relationships.

Typically, most relationships are between three facts, although some are between two facts, five facts, or any other number of facts. For the sake of simplicity, it is assumed in the following pseudo-code program that all relations are 3-fact relations. Thus, each relation has three slots, where each slot is filled by a fact. Consider the case where two of these slots are filled from the pool of facts and the value for the third slot can be calculated. Each fact may be used only once in a relation. If all three slots are filled, then the relation is considered satisfied.

Pseudo-Code Program

```
collect facts from input.
collect relevant facts from database.
*there is now a pool of known facts*
begin:
for each relation which has not been completed
    for each fact
        if this fact used in that relation
            if there is no competing fact available
                use this fact for the slot
            else
                apply rules and generate score for new fact
                if score for this fact is better than
                for the existing fact
                    replace the inferior fact in the slot
                    with this fact
                endif
            endif
        endif
    endfor
    if two slots filled
        calculate the third, adding it to the pool of available facts
        goto begin (restart the whole relation loop again)
    endif
endfor
```

On FIG. 2, facts are shown collected from the input 12 and from the database maintained in the memory 13 to form a pool of known facts 23. The system begins processing (100) to solve a specific problem. For each incomplete relation (110), if all facts have not yet been considered (250), each fact (120) is tested to determine if the fact is used in the relation (130). If the fact is not used in the relation (130), another fact is tested (140). If all facats have been considered (250), then the system determines if two slots have been filled (210) (see below).

If the fact is used in the relation, then there is a determination if a competing fact is available (150). If a competing fact is not available, then the fact is used in the relation (160). If a competing fact is available, then the rules are applied (170) by the rules module 16 to determine the score for the current fact vis-a-vis previously selected facts.

Thus, Rule 1 (as defined in rules module 16) is implemented to determine if any fact is based upon a previous fact that is used with the present fact to produce an additional fact. The system next proceeds to implement Rule 2, i.e. to determine whether any fact is based upon more than one input. If a fact is based upon more than one input, it is a derived fact based upon more than one independent fact, and the system proceeds to implement Rule 3, ie. the system then determines whether the fact is based upon a short or a long series of relationships.

After the rules have been applied to the fact and a score is generated for the fact, it is determined whether the score for the present fact is better than the score for a previously examined fact (180). If the score is inferior to the score of previously examined fact(s), then another fact is used to fill the slots of the relation (200). If the score of the current fact is better than that of previously examined fact(s), then the inferior fact(s) is replaced (190). The system then determines if all facts have been considered (240). If not, the system proceeds to test each fact (120) to determine if the fact is used in the relation (130) (as discussed above).

If all facts have been considered (240), it is next determined if two slots are filled (210) (in a 3-slot system, other systems test for different numbers of slots). If two slots are not filled, then the relation is incomplete and additional facts must be added to the slots (110). If two slots are filled, then the value for the third slot is calculated (220) and the new fact is added to the fact pool (230), at which point the process may repeat for a next fact (100). Thus, each relevant fact is tested until all useful facts have been applied to the problem at hand in accordance with various rules, as discussed above.

The invention is intended for application to any problem solving task where decisions must be made regarding which of several facts are to be used and which of these facts are to be ignored or discarded. The following examples provide an illustration of the application of the three basic rules discussed above that are implemented by the invention to perform decision making during a problem solving exercise. It will be appreciated by those skilled in the art that the invention is readily applied to any problem that can be solved on a computer and it is therefore expected that the invention will find application as a decision making module for many types of problem solving situation. Thus, the following examples provide an illustration of simple problem solving tasks to which the invention may be put.

EXAMPLE 1

Rule 1: Almost never use a fact based on a particular original input in combination with original input, or a different fact based on that same original input.

It is desired to display, among other things, the electrical resistance through a rectangular solid having an end area of 0.2 microns * 1 micron, and a length of 0.15 inches.

The user enters:

0.2 micron 1 micron 0.15 inch copper

A relationship exists within the input data that must combine the facts: area, length, and ohms per area/length, the latter being a constant for any given electrical conductor. This relationship is capable of generating the theoretical resistance of any rectangular solid of a conductor for which this constant is known. This relationship cannot be calculated immediately because the "area" fact: is unavailable. However, another relationship requires two lengths to calculate an area, after which the relationship can be satisfied. This area fact is equal in status to all other known information, including the original three side specification.

The relationship, when selecting a length to combine with the area, must not select either of the sides that are used to calculate the area, rejecting them in turn until a side which has never been used to generate any of the other facts is used to satisfy the relation. The volume relation (area * length= volume) must similarly reject sides used to make the area and select the unused side.

EXAMPLE 2

Rule 2: Almost always use a fact based on the most original inputs available.

When calculating the mass of a wire, the wire may be thought of as a cylinder. Once the volume of the cylinder is known, and if the density of the material is known, then the mass can be calculated.

The user enters:

16 awg 1 mile aluminum

The user expects, among other things, the mass of such piece of wire to be displayed. The mass is calculated by multiplying meters$^3$ * grams/meter$^3$, thereby yielding grams. This relation requires finding a volume fact, and a density fact. The problem to be solved is that a cylinder in such a set of facts always generates two volumes.

Wires are modeled as cylinders. The volume of a cylinder can be calculated by knowing one of several ways to define the circle at the end. In the example, the value 16 AWG is converted into a diameter. However, if the diameter is known, many other things about this circle are immediately implied:

the radius of the circle;

the area of the circle;

the circumference of the circle; and the volume of an enclosed sphere.

The volume of the cylinder is calculated by allowing the diameter to be expanded into all of the above, which includes the volume of the sphere. This creates a problem, how to discriminate correctly between two available volumes, that of the cylinder, and that of the sphere. In this example, the volume of the sphere is calculated using one input. The volume of the cylinder is calculated using two inputs. Thus, the volume of the cylinder is the preferred volume.

EXAMPLE 3

Rule 3: Facts calculated from longer chains of relationships are inferior to facts calculated from shorter chains of relationships.

Given a standing cylinder having a radius of 1 meter and a volume of 1 cubic meter, where the cylinder is filled with a material having a specific gravity of 1.0 (i.e. water), determine the pressure on the bottom of the cylinder.

The pressure is determined by calculating the weight of the contained material, and then dividing the calculated weight by the area. Again, it is necessary to discriminate between the original input volume (1 m$^3$) and the calculated volume of the inscribed sphere. However, in this case both volumes are related to exactly one input. The input volume, however, has a relationship chain length of 0, while the calculated volume has a relationship chain length of 1.

The user enters:

1 m3 m radius sg g

The program returns the following fact:

pressure=force/area 3121.6 pascal pressure

It will be appreciated by those skilled in the art that the actual physical and software implementation of the invention is a matter of choice. For example, the invention is readily implemented in a standard Windows-, Macintosh-, or Unix-based computer without the need to modify either the computer hardware or operating system, except with regard to system configuration, e.g. memory size, number of I/O ports, I/O devices selected, and processor speed. The software portion of the invention is readily implemented by those skilled in the art using such well known computer languages as C++, and such popular programming techniques as linear programming or object-oriented programming.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A rules-based method for discriminating amongst a plurality of facts to solve a problem and arrive at a best result, said method implemented in a system comprising a processor; a memory for providing storage for modules that provide said processor with known facts, information necessary as part of a problem solving process, definitions of relationships among information that are applied during said problem solving process, and other facts that are generated during earlier steps of said problem solving process; a user input module that includes means for user input of user facts, and means for user input of a problem definition, such that said processor is configured to solve a particular problem; a system input module; an output module; and a rules module comprising means for applying decision-making rules in any order to determine how said processor processes said inputs, said method comprising the steps of:

inputting with said user input module user and system facts for application to solution of said problem; and applying primary decision-making rules in any order to process said inputs, wherein said rules comprise the following:

assigning a lower value to facts based on combining an input and a fact which was based on that particular input;

assigning a lower value to a fact based on a single input and, assigning a higher value to a fact based on more than one input;

assigning a lower value to a fact based on a longer series of relationships and assigning a higher value to a fact based on a shorter series of relationships;

searching all available facts to determine if any facts are available to solve said problem;

saving any facts that are determined to be available to solve said problem in said memory; and continuing to look for additional facts that may be more appropriate, based upon application of at least one of said above rules.

2. The method of claim 1, wherein, once all of said facts are considered, if one and only one fact is located, then that fact is used, and wherein if two or more facts are available, then a one of said facts having a highest score is selected and applied to s aid problem.

3. A method for selecting among competing facts to achieve a desired calculation, said method implemented in a system comprising a processor:

a memory for providing storage for modules that provide said processor with known facts, information necessary as part of a problem solving process, definitions of relationships among information that are applied during said problem solving process, and other facts that are generated during earlier steps of said problem solving process; a user input module that includes means for user input of user facts, and means for user input of a problem definition, such that said processor is configured to solve a particular problem; a system input module; an output module; and a rules module comprising means for applying decision-making rules in any order to determine how said processor processes said inputs, said method comprising the steps of:

defining a problem to be solved;

inputting with said user input module any known facts or desired outcomes;

selecting facts from all facts available as input, wherein the facts selected are those that match a desired fact type;

solving said problem if there is not more than one fact available;

applying at least one rule to each fact if more than one fact is available, wherein said rule comprises one or more of the following:

determining if all of said facts are each based on a common input fact;

determining if any of said facts are based upon an input value with which the fact is to be used;

determining if any fact is based upon more than one input; and determining which facts are based upon a shortest series of relationships;

assigning a score to each fact based upon application of said at least one rule;

solving said problem using those facts having the highest score;

storing new facts generated as a result of said solving step in said memory; and looking for additional facts that may be more appropriate, based upon application of at least one of said above rules.

4. The method of claim 3, further comprising the step of selecting another fact if any of said facts are derived from an input value that is to be used to solve said problem, unless all facts currently being examined are based upon facts that are to be used during to solve said problem, in which event said problem is solved.

5. The method of claim 3, further comprising the step of:

selecting another fact if a fact is not based upon more than one input.

6. The method of claim 5, further comprising the step of:

selecting only those facts that are based on the greatest number of inputs.

7. A method for selecting among competing facts to achieve a desired calculation, said method implemented in a system comprising a processor:

a memory for providing storage for modules that provide said processor with known facts, information necessary as part of a problem solving process, definitions of relationships among information that are applied during said problem solving process, and other facts that are generated during earlier steps of said problem solving process; a user input module that includes means for user input of user facts and means for user input of a problem definition such that said processor is configured to solve a particular problem; a system input module; an output module; and a rules module comprising means for applying decision-making rules in any order to determine how said processor processes said inputs, said method comprising the steps of:

defining a problem to be solved;

inputting via said user input module any known facts or desired outcomes;

selecting facts from all facts available as input, wherein the facts selected are those that match a desired fact type;

determining if any of said facts are based upon an input value with which the fact is to be used;

selecting another fact if any of said facts are derived from an input value that is to be used to solve said problem, unless all facts currently being examined are based upon facts that are to be used during to solve said problem, in which event said problem is solved;

determining if any fact is based upon more than one input;

selecting those facts that are based upon a greatest number of inputs;

determining which facts are based upon a shortest series of relationships;

solving said problem if there is not more than one fact available;

storing new facts generated as a result of said solving step in said memory; and looking for additional facts that may be more appropriate, based upon application of at least one of said above rules.

8. A system for selecting among competing facts to solve a problem, comprising:

a processor;

a memory for providing storage for modules that provide said processor with known facts, information necessary as part of a problem solving process, definitions of relationships among information that are applied during said problem solving process, and other facts that are generated during earlier steps of said problem solving process;

a user input module includes means for user input of user facts, and means for user input of a problem definition, such that said processor is configured to solve a particular problem;

a system input module;

an output module; and a rules module for examining all facts and for assigning scores to each fact based upon predetermined criteria, wherein said rules module comprises means for applying decision-making rules in any order to determine how said processor processes said inputs, wherein said rules comprise the following:

assigning a lower score to facts produced by combining an input and a fact which was based on that particular input;

assigning a lower score to a fact based on a single input and assigning a higher score to a fact based on more than one input; and assigning a lower score to a fact based on a longer series of relationships and assigning a higher score to a fact based on a shorter series of relationships.

9. The system of claim 8, further comprising:

means for using an output from said output module as part of a next stage in said problem solving process.

10. A system for selecting among competing facts to achieve a desired calculation, comprising:

an input module by which a user may define a problem to be solved, and by which said user may input any known facts or desired outcomes;

a processor for selecting facts from all facts available as input, wherein the facts selected are those that match a desired fact type;

a rules module for determining if any of said facts are based upon an input value with which the fact is to be used, said processor selecting another fact if any of said facts are derived from an input value that is to be used to solve said problem, unless all facts currently being examined are based upon facts that are to be used during to solve said problem, in which event said problem is solved by said processor, said rule module determining if any fact is based upon more than one input, said processor selecting those facts that are based upon a greatest number of inputs, said rules module determining which facts are based upon a shortest series of relationships, said processor solving said problem if there is not more than one fact available;

a memory for storing new facts generated as a result of said solving step, wherein said processor looks for additional facts that may be more appropriate, based upon application of at least one of said above rules.

* * * * *